US009462045B2

United States Patent
Glickfield et al.

(10) Patent No.: US 9,462,045 B2
(45) Date of Patent: Oct. 4, 2016

(54) TRIGGERING A COMMUNICATIVE ACTION BASED ON A CLIENT-DETERMINED RELATIONSHIP BETWEEN PROXIMATE CLIENT DEVICES

(71) Applicant: QUALCOMM Incorporated, San Diego, CA (US)

(72) Inventors: Sarah Glickfield, Jerusalem (IL); Isaac David Guedalia, Bet Shemesh (IL); Peter Charles Whale, Ely (GB); Hugh O'Donoghue, Dublin (IE)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 14/455,653

(22) Filed: Aug. 8, 2014

(65) Prior Publication Data

US 2016/0044090 A1 Feb. 11, 2016

(51) Int. Cl.
*H04L 29/08* (2006.01)
*H04W 4/00* (2009.01)
*H04W 4/02* (2009.01)
*G06F 21/62* (2013.01)
*G06Q 10/10* (2012.01)
*G06Q 50/00* (2012.01)

(52) U.S. Cl.
CPC ........... *H04L 67/10* (2013.01); *G06F 21/6245* (2013.01); *G06Q 10/10* (2013.01); *G06Q 50/01* (2013.01); *H04W 4/008* (2013.01); *H04W 4/02* (2013.01)

(58) Field of Classification Search
CPC ...... H04L 67/10; H04W 4/008; H04W 4/02; G06Q 50/01; G06Q 10/10; G06F 21/6245
See application file for complete search history.

(56) References Cited

U.S. PATENT DOCUMENTS

| 8,639,756 | B2 | 1/2014 | Bostrom et al. |
| 2009/0265242 | A1 | 10/2009 | Horvitz et al. |
| 2010/0280965 | A1* | 11/2010 | Vesterinen .......... G06F 21/6245 705/319 |
| 2012/0054132 | A1 | 3/2012 | Aberdeen et al. |
| 2012/0158935 | A1 | 6/2012 | Kishimoto et al. |
| 2012/0331418 | A1 | 12/2012 | Bonforte |

FOREIGN PATENT DOCUMENTS

| GB | 2368498 | * | 5/2002 | ............. H04L 67/10 |
| GB | 2368498 A | | 5/2002 | |

OTHER PUBLICATIONS

International Search Report and Written Opinion—PCT/US2015/043461—ISA/EPO—Oct. 19, 2015.

* cited by examiner

*Primary Examiner* — Kim T Nguyen
(74) *Attorney, Agent, or Firm* — Muncy, Geissler, Olds & Lowe, P.C.

(57) ABSTRACT

In an aspect, a client device detects a set of proximate client devices. The client device classifies, for each respective proximate client device in the set of proximate client devices, a relationship relative to an operator of the client device based on a local evaluation of one or more interactions between the client device and at least one proximate client device from the set of proximate client devices in response to the detecting. The client device determines whether to automatically trigger a communicative action with one or more proximate client devices from the set of proximate client devices based on the classifying.

30 Claims, 8 Drawing Sheets

TRIGGERING A COMMUNICATIVE ACTION BASED ON A CLIENT-DETERMINED RELATIONSHIP BETWEEN PROXIMATE CLIENT DEVICES

INTRODUCTION

Aspects of this disclosure relate generally to triggering a communicative action based on a client determined relationship between proximate client devices.

If a user wants to automatically share information (e.g., a WiFi access code, etc.) via a client device with one or more other users operating one or more other client devices, the user is required to have predefined relationships with the one or more other users that are defined manually by the user. For example, if the user carries a first client device at a shopping mall, the user would not want sensitive information to be automatically delivered to another client device unless the other client device is presumed to be authorized to receive the sensitive information based on the other client device having a predefined relationship with the user (e.g., such as the user having previously identified the other client device as a "friend", "family member" or "business colleague" in a contact list of the first client device, etc.).

Similarly, if the user wants to search for information (e.g., a list of digital movies or e-books available for borrowing, etc.) on other client devices, the other client devices will not necessarily authorize the client device to obtain access to the information unless the other client devices recognize the predetermined relationship with the user (e.g., such as users of the other client devices having previously identified the first client device as a "friend", "family member" or "business colleague" in a contact list of the other client devices, etc.).

Accordingly, automatic dissemination of sensitive data between client devices is typically only permitted when the client device providing the data recognizes the other client device as a trusted device via the predetermined relationship that is formed based on manual effort by a user operating the client device providing the data. Without such a predetermined relationship, the sensitive data would only be shared with the approval of the user, and not automatically.

SUMMARY

An aspect is directed to a method whereby a client device detects a set of proximate client devices. The client device classifies, for each respective proximate client device in the set of proximate client devices, a relationship relative to an operator of the client device based on a local evaluation of interactions between the client device and at least one proximate client device from the set of proximate client devices in response to the detecting. The client device determines whether to automatically trigger a communicative action with one or more proximate client devices from the set of proximate client devices based on the classifying.

Another aspect is directed to a client device that includes means for detecting a set of proximate client devices. The client device further includes means for classifying, for each respective proximate client device in the set of proximate client devices, a relationship relative to an operator of the client device based on a local evaluation of one or more interactions between the client device and at least one proximate client device from the set of proximate client devices in response to the detecting. The client device further includes means for determining whether to automatically trigger a communicative action with one or more proximate client devices from the set of proximate client devices based on the classifying.

Another aspect is directed to a client device that includes logic configured to detect a set of proximate client devices. The client device further includes logic configured to classify, for each respective proximate client device in the set of proximate client devices, a relationship relative to an operator of the client device based on a local evaluation of one or more interactions between the client device and at least one proximate client device from the set of proximate client devices in response to the detecting. The client device further includes logic configured to determine whether to automatically trigger a communicative action with one or more proximate client devices from the set of proximate client devices based on the classifying.

Another aspect is directed to a non-transitory computer-readable medium containing instructions stored thereon, which, when executed by a client device, cause the client device to perform operations. The instructions executed by the client device include at least one instruction to cause the client device to detect a set of proximate client devices. The instructions executed by the client device further include at least one instruction to cause the client device to classify, for each respective proximate client device in the set of proximate client devices, a relationship relative to an operator of the client device based on a local evaluation of one or more interactions between the client device and at least one proximate client device from the set of proximate client devices in response to the detecting. The instructions executed by the client device further include at least one instruction to cause the client device to determine whether to automatically trigger a communicative action with one or more proximate client devices from the set of proximate client devices based on the classifying.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
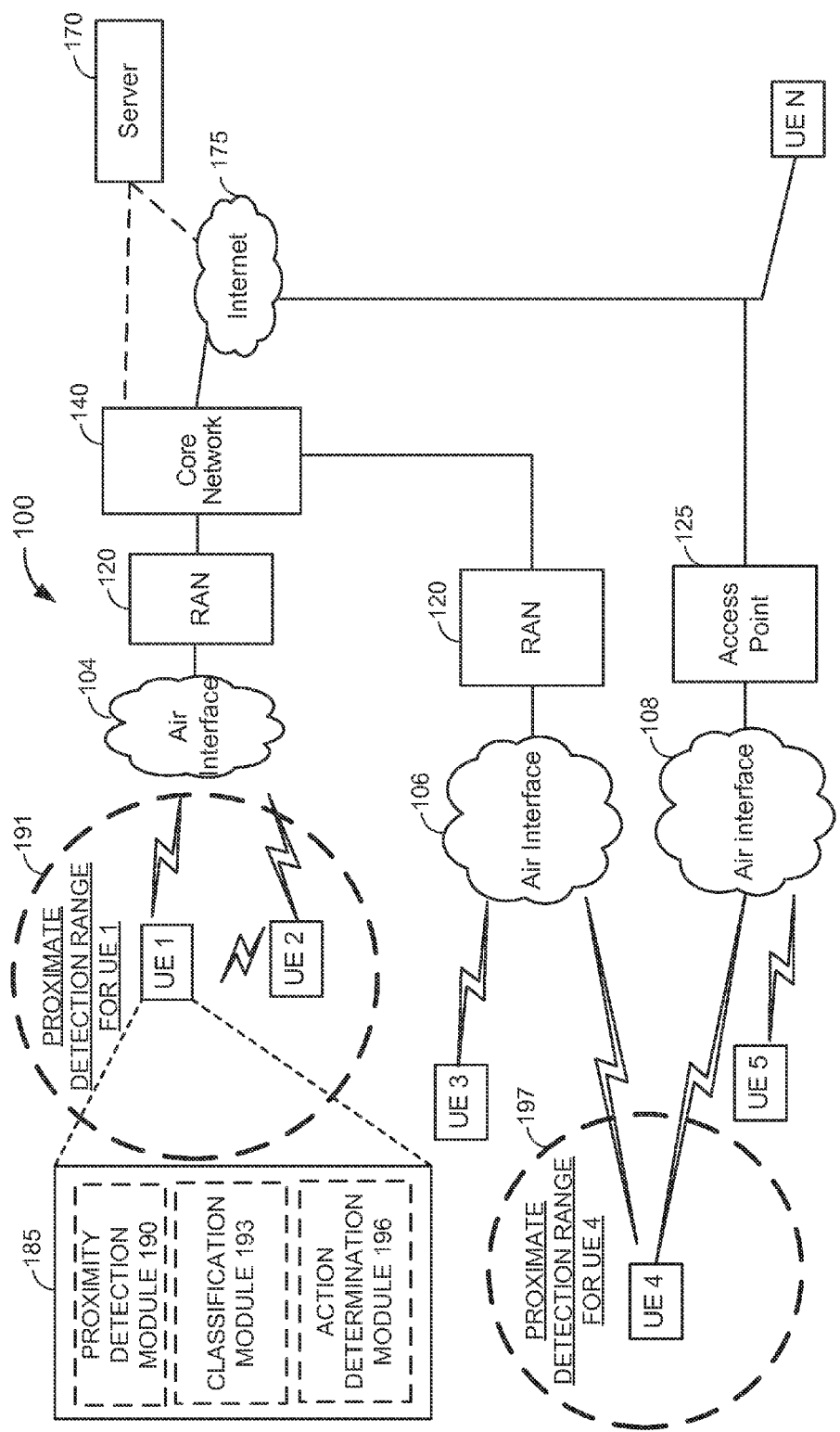
FIG. 1 illustrates a high-level system architecture of a wireless communications system in accordance with an aspect of the disclosure.
Figure 2:
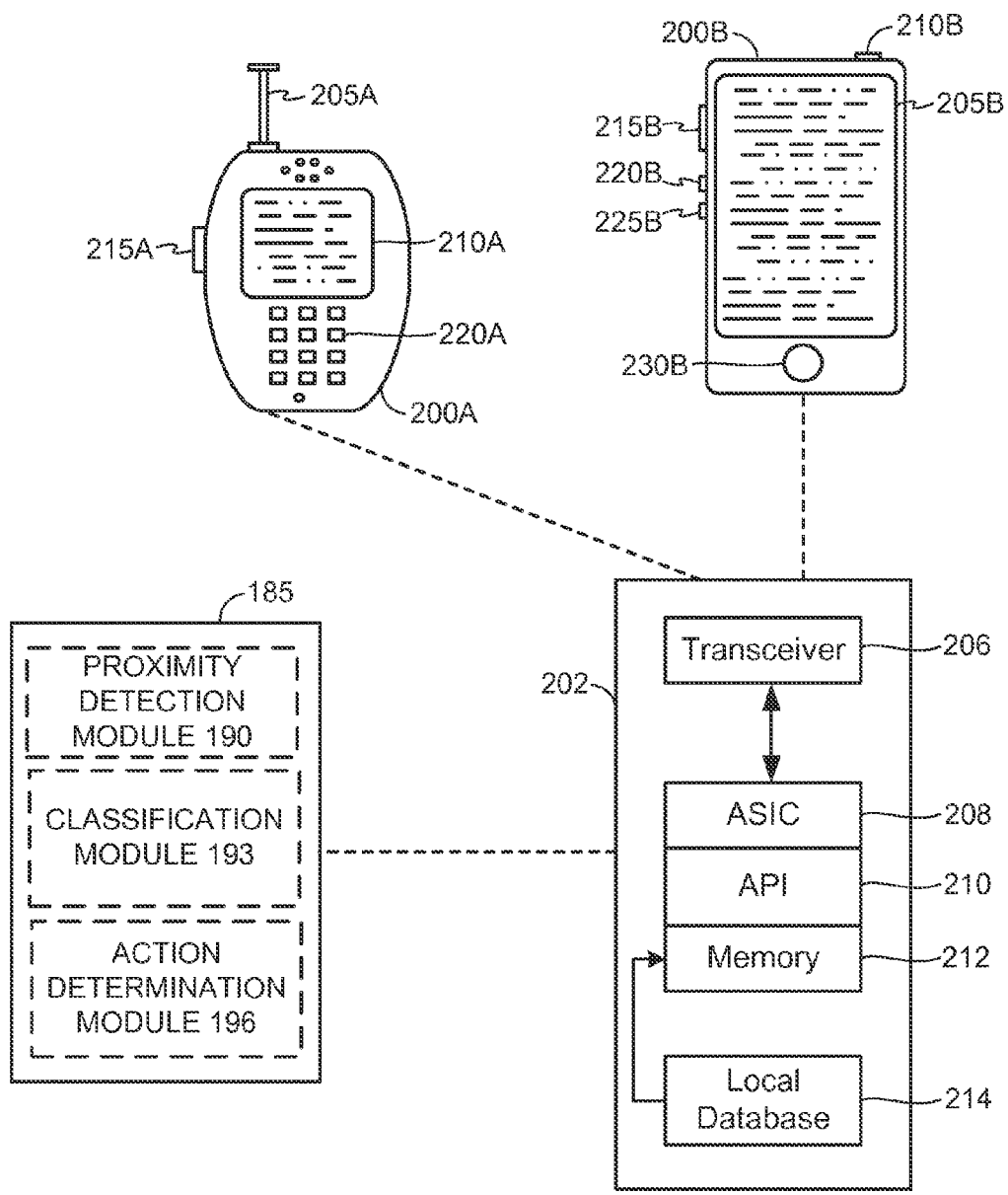
FIG. 2 illustrates examples of user equipments (UEs) in accordance with aspects of the disclosure.
Figure 3:
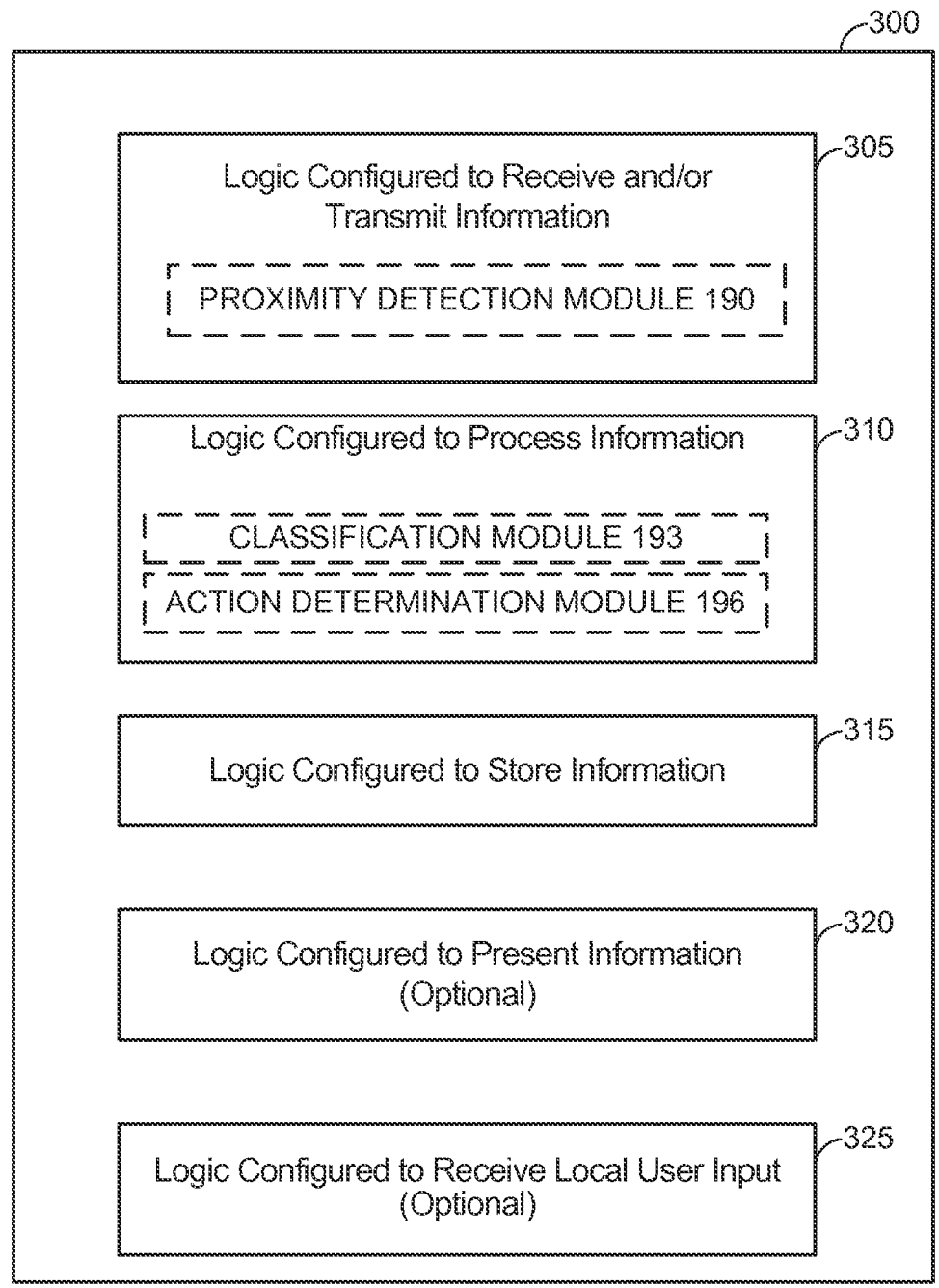
FIG. 3 illustrates a communication device that includes logic configured to perform functionality in accordance with an aspect of the disclosure.
Figure 4:
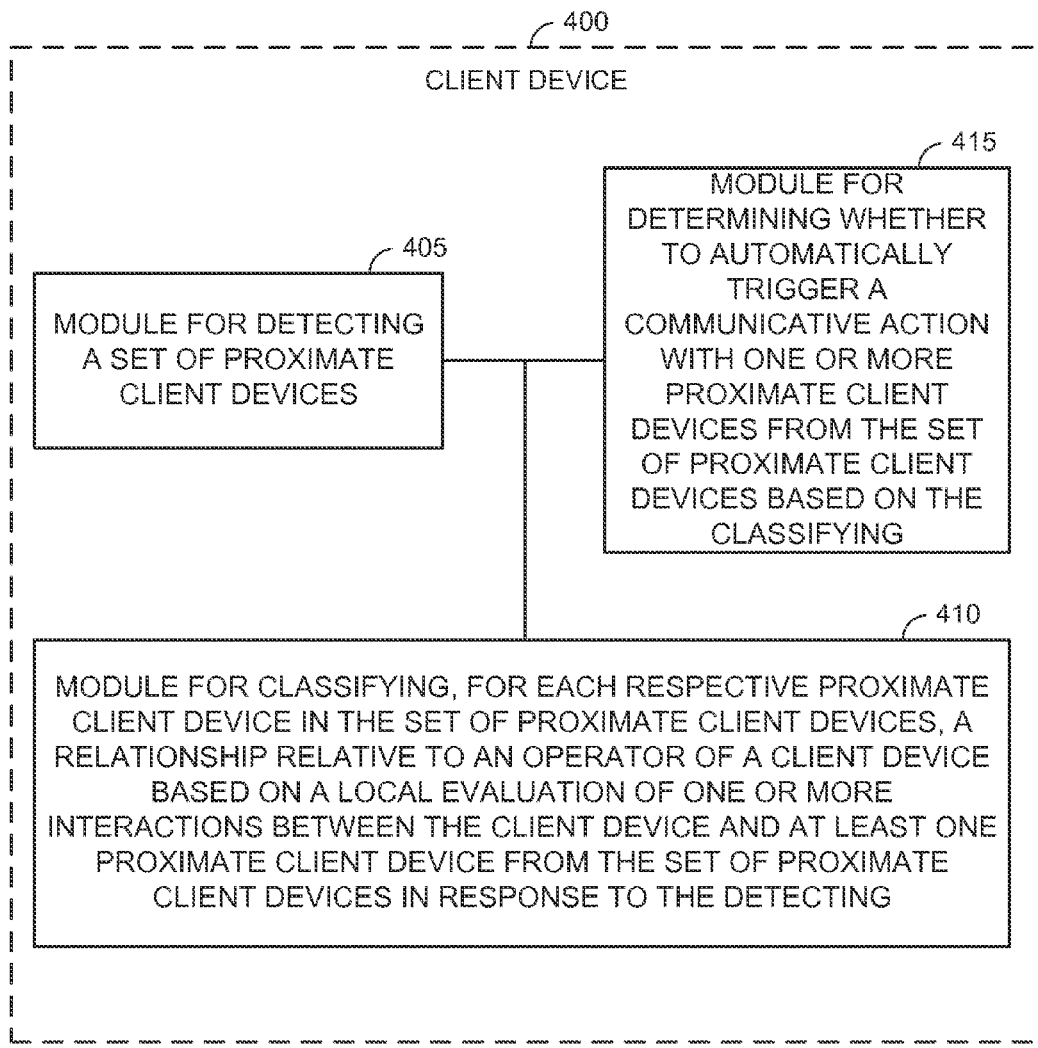
FIG. 4 illustrates an example client device represented as a series of interrelated functional modules.

The disclosure relates in some aspects to triggering a communicative action based on a client determined relationship between proximate client devices. As will be described below in more detail, FIG. 1 illustrates a communication environment whereby one or more user equipments (UEs) or client devices can detect other nearby (or proximate) UEs or client devices. FIGS. 2-4 illustrate examples of UEs or client devices that can perform the aforementioned proximity detection. In an aspect of the disclosure, a given UE or client device can use the aforementioned proximity detection to classify one or more proximately detected UEs or client devices so as to trigger a communicative action (e.g., see FIGS. 5-6). For example, one aspect of the disclosure relates to sharing protected information such as a password (e.g., an access point password) or digital content with a proximate client device that has a qualifying relationship relative to a source client device (e.g., see FIG. 7 or 9). Another aspect of the disclosure relates to requesting protected information such as digital content from the proximate client device that has the qualifying relationship relative to a source client device (e.g., see FIG. 8).

Aspects of the disclosure are disclosed in the following description and related drawings directed to specific aspects of the disclosure. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. As used herein, a "set" refers to any grouping of items (in this case, computer instructions) that includes at least one respective item. So, the set of computer instructions can include a single computer instruction, or a plurality of computer instructions. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on Institute of Electrical and Electronics Engineers (IEEE) 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an aspect of the disclosure. The wireless communications system 100 contains UEs 1 . . . N. The UEs 1 . . . N can include cellular telephones, personal digital assistants (PDAs), pagers, a laptop computer, a desktop computer, and so on.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., Code Division Multiple Access (CDMA), Evolution-Data Optimized (EVDO), evolved High Rate Packet Data (eHRPD), Global System for Mobile Communications (GSM), Enhanced Data Rates for GSM Evolution (EDGE), Wideband-CDMA (W-CDMA), Long Term Evolution (LTE), etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, a server 170 is shown as connected to the Internet 175, the core network 140, or both. The server 170 can be implemented as a plurality of structurally separate servers, or alternately may correspond to a single server. As will be described below in more detail, the server 170 is configured to support one or more communication services (e.g., Voice-over-Internet Protocol (VoIP) sessions, Push-to-Talk (PTT) sessions, group communication sessions, social networking services, etc.) for UEs that can connect to the server 170 via the core network 140 and/or the Internet 175, and/or to provide content (e.g., web page downloads) to the UEs.

In an example, the server 170 may include a processor coupled to volatile memory and a large capacity nonvolatile memory, such as a disk drive. The server 170 may also include a floppy disc drive, compact disc (CD) or DVD disc drive coupled to the processor. The server 170 may also include network access ports coupled to the processor for establishing data connections with a network, such as a local area network (e.g., RAN 120, AP 125, etc.) coupled to other broadcast system computers and servers or to the Internet 175.

Referring to FIG. 1, in an example, UE 1 is configured with a set of modules 185 for performing a proximity detection function and for triggering certain actions based on the proximity detection function. In particular, the set of modules 185 includes a proximity detection module 190, a classification module 193 and an action determination module 196. The proximity detection module 190 is configured to detect one or more other UEs in proximity to UE 1. For example, the proximity detection module 190 can include a Near Field Communication (NFC) transceiver (e.g., a Bluetooth transceiver, etc.) that is configured to detect NFC beacons from other proximate UEs. The proximity detection module 190 is associated with a proximity detection range 191 whereby one or more proximately located UEs are expected to be capable of detection by the proximity detection module 190 of UE 1. As shown in FIG. 1, UE 2 is inside the proximate detection range 191 and is thereby capable of being proximately detected by the proximity detection module 190 of UE 1, whereas UEs 2 . . . N are outside of the proximate detection range 191 and are unlikely to be detected as proximate by the proximity detection module 190 of UE 1.

The classification module 193 can include logic that, when executed by a processor of UE 1, permits UE 1 to classify one or more relationships to one or more proximately detected UEs. The action determination module 196 can include logic that, when executed by a processor of UE 1, permits UE 1 to determine whether to perform one or more communicative actions with any of the one or more proximately detected UEs. More detailed examples of the various functionality of the proximity detection module 190, the classification module 193 and the action determination module 196 will be provide below with respect to FIGS. 5-9.

Also shown in FIG. 4 is a proximate detection range 197 associated with UE 4. For example, while not shown explicitly in FIG. 1, UE 4 can be equipped with the set of modules 185 in a similar manner as compared to UE 1, although UE 4 is in a different location and is likely to have a different set of proximate UEs. In FIG. 1 for example, each of UEs 1 . . . 3 and 5 . . . N are shown as outside the proximate detection range 197 of UE 4, and are thereby unlikely to be detected as proximate by UE 4.

FIG. 2 illustrates examples of UEs (i.e., client devices) in accordance with aspects of the disclosure. Referring to FIG. 2, UE 200A is illustrated as a calling telephone and UE 200B is illustrated as a touchscreen device (e.g., a smart phone, a tablet computer, etc.). As shown in FIG. 2, an external casing of UE 200A is configured with an antenna 205A, display 210A, at least one button 215A (e.g., a PTT button, a power button, a volume control button, etc.) and a keypad 220A among other components, as is known in the art. Also, an external casing of UE 200B is configured with a touchscreen display 205B, peripheral buttons 210B, 215B, 220B and 225B (e.g., a power control button, a volume or vibrate control button, an airplane mode toggle button, etc.), at least one front-panel button 230B (e.g., a Home button, etc.), among other components, as is known in the art. While not shown explicitly as part of UE 200B, the UE 200B can include one or more external antennas and/or one or more integrated antennas that are built into the external casing of UE 200B, including but not limited to WiFi antennas, cellular antennas, satellite position system (SPS) antennas (e.g., global positioning system (GPS) antennas), and so on.

While FIG. 2 illustrates UE 200A with display 210A and UE 200B with touchscreen display 205B, it will be appreciated that other UEs can be implemented in accordance with a multi-display configuration (e.g., a front display and a rear display, two non-contiguous displays on a single side of the respective UE, a combination of a screen display and a projection display, or any combination thereof). Further, while internal components of UEs such as the UEs 200A and 200B can be embodied with different hardware configurations, a basic high-level UE configuration for internal hardware components is shown as platform 202 in FIG. 2. The platform 202 can receive and execute software applications, data and/or commands transmitted from the RAN 120 that may ultimately come from the core network 140, the Internet 175 and/or other remote servers and networks (e.g., server 170, web Uniform Resource Locators (URLs), etc.). The platform 202 can also independently execute locally stored applications without RAN interaction. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 210 layer that interfaces with any resident programs in the memory 212 of the wireless device. The memory 212 can be comprised of read-only or random-access memory (RAM and ROM), Electrically Erasable Programmable Read-Only Memory (EEPROM), flash cards, or any memory common to computer platforms. The platform 202 also can include a local database 214 that can store applications not actively used in memory 212, as well as other data. The local database 214 is typically a flash memory cell, but can be any secondary storage device as known in the art, such as magnetic media, EEPROM, optical media, tape, soft or hard disk, or the like.

Accordingly, an aspect of the disclosure can include a UE (e.g., UE 200A, 200B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UEs 200A and 200B in FIG. 2 are to be considered merely illustrative and the disclosure is not limited to the illustrated features or arrangement.

The wireless communication between the UEs 200A and/or 200B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the aspects of the disclosure and are merely to aid in the description of aspects of aspects of the disclosure.

Furthermore, with reference to FIG. 2, the platform 202 is one example of how the set of modules 185 described above with respect to FIG. 1 can be implemented. For example, the proximity detection module 190 can be implemented by the transceiver 206 in combination with ASIC 208, whereby the transceiver 206 detects one or more signals from one or more proximate UEs (e.g., one or more NFC signals such as Bluetooth, one or more WiFi signals, etc.) and ASIC 208 analyzes the one or more detected signals. The classification module 193 can be implemented by the ASIC 208 and memory 212, whereby the ASIC 208 evaluates a log of one or more interactions from the memory 212 so as to classify one or more proximately detected UEs in an example. The action determination module 193 can be implemented by the ASIC 208, whereby the ASIC 208 determines whether a particular communicative action can be triggered in response to the classification(s) of the one or more proximately detected UEs in an example.

FIG. 3 illustrates a communication device 300 that includes logic configured to perform functionality. The communication device 300 can correspond to any of the above-noted communication devices, including but not limited to UEs 200A or 200B, any component of the RAN 120, any component of the core network 140, any components coupled with the core network 140 and/or the Internet 175 (e.g., the server 170), and so on. Thus, communication device 300 can correspond to any electronic device that is configured to communicate with (or facilitate communication with) one or more other entities over the wireless communications system 100 of FIG. 1.

Referring to FIG. 3, the communication device 300 includes logic configured to receive and/or transmit information 305. In an example, if the communication device 300 corresponds to a wireless communications device (e.g., UE 200A or 200B, access point 125, a BS, Node B or eNodeB in the RAN 120, etc.), the logic configured to receive and/or transmit information 305 can include a wireless communications interface (e.g., Bluetooth, WiFi, 2G, CDMA, W-CDMA, 3G, 4G, LTE, etc.) such as a wireless transceiver and associated hardware (e.g., an RF antenna, a modulator-demodulator (MODEM), a modulator and/or demodulator, etc.). In another example, the logic configured to receive and/or transmit information 305 can correspond to a wired communications interface (e.g., a serial connection, a Universal Serial Bus (USB) or Firewire connection, an Ethernet connection through which the Internet 175 can be accessed, etc.). Thus, if the communication device 300 corresponds to some type of network-based server (e.g., server 170, etc.), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local radio frequency (RF) signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality. Furthermore, the logic configured to receive and/or transmit 305 is one example of how the proximity detection module 190 can be implemented, whereby the logic configured to receive and/or transmit 305 detects one or more signals from one or more proximate UEs (e.g., one or more NFC signals such as Bluetooth, one or more WiFi signals, etc.).

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any type of processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality. Furthermore, the logic configured to process information 310 is one example of how the classification module 193 and action determination module 196 can be implemented, whereby the classification module 193 evaluates a log of one or more interactions to classify one or more proximately detected UEs in an example, and the action determination module 193 determines whether a particular communicative action can be triggered in response to the classification(s) of the one or more proximately detected UEs in an example.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM memory, flash memory, ROM memory, Erasable Programmable ROM (EPROM) memory, EEPROM memory, registers, hard disk, a removable disk, a Compact Disc (CD)-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, High-Definition Multimedia Interface (HDMI), etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to UE 200A or UE 200B as shown in FIG. 2, the logic configured to present information 320 can include the display 210A of UE 200A or the touchscreen display 205B of UE 200B. In a further example, the logic configured to present information 320 can be omitted for certain communication devices, such as network communication devices that do not have a local user (e.g., network switches or routers, remote servers such as the server 170, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to UE 200A or UE 200B as shown in FIG. 2, the logic configured to receive local user input 325 can include the keypad 220A, any of the buttons 215A or 210B through 225B, the touchscreen display 205B, etc. In a further example, the logic configured to receive local user input 325 can be omitted for certain communication devices, such as network communication devices that do not have a local user (e.g., network switches or routers, remote servers such as the server 170, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

FIG. 4 illustrates an example client device 400 (such as a UE) represented as a series of interrelated functional modules. A module for detecting a set of proximate client devices 405 is an example implementation of the proximity detection module 190 introduced with respect to FIG. 1, and may correspond at least in some aspects to, for example, the logic configured to receive and/or transmit information 305 as discussed herein. A module for classifying 410, for each respective proximate client device in the set of proximate client devices, a relationship relative to an operator of the client device based on a local evaluation of one or more interactions between the client device and at least one proximate client device from the set of proximate client devices in response to the detecting may correspond at least in some aspects to, for example, the logic configured to process information 310 as discussed herein. The module for classifying 410 is an example implementation of the classification module 193 introduced with respect to FIG. 1. A module for determining 415 whether to automatically trigger a communicative action with one or more proximate client devices from the set of proximate client devices based on the classifying may correspond at least in some aspects to, for example, the logic configured to process information 310 as discussed herein. The module for determining 410 is an example implementation of the action determination module 196 introduced with respect to FIG. 1. As will be described below in more detail, modules 405, 410 and 415 can be used to implement 500, 505 and 510, respectively, of FIG. 5 as will be described below in more detail.

Figure 5:
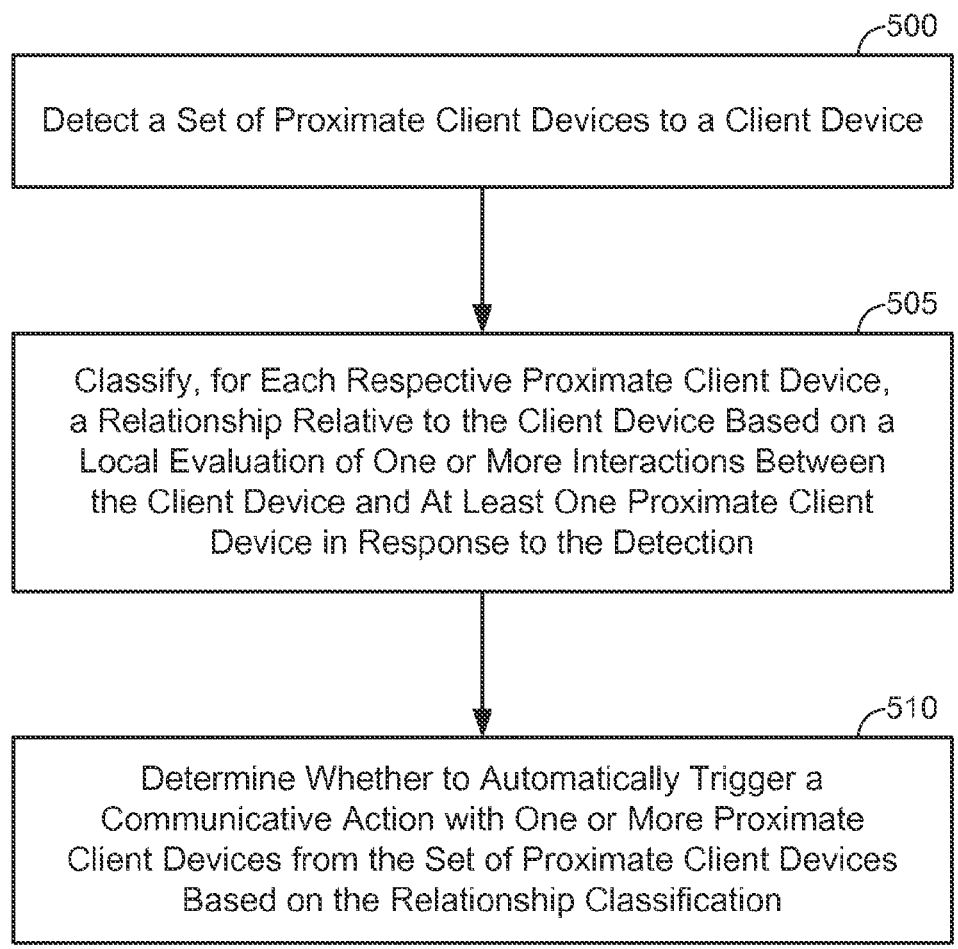
FIG. 5 illustrates a process of client-based procedure for selectively triggering an automatic communicative action in accordance with an aspect of the disclosure.

FIG. 5 illustrates a process of client-based procedure for selectively triggering an automatic communicative action in accordance with an aspect of the disclosure. The process of FIG. 5 is performed at a given client device, whereby the given client device can correspond to a UE as in any of the aforementioned examples (e.g., UE 200A, UE 200B, communication device 300, etc.).

Referring to FIG. 5, the given client device detects a set of client devices that are proximate to the given client device, 500. As noted above, a "set" refers to any grouping of items (in this case, client devices) that includes at least one respective item. So, the set of client devices detected at 500 can include a single client device, or a plurality of client devices. The detection of 500 can occur in any number of ways. For example, the given client device can detect the set of proximate client devices via a local wireless communications interface (e.g., Bluetooth, WiFi, etc.), such as a peer-to-peer (P2P) communications interface. In an alternative example, the set of proximate client devices can be detected on a local network, with proximity being assumed based on the given client device being logged into the same local network as the set of proximate client devices. Other examples of how proximity can be detected between the respective client devices include a location coordinate comparison (e.g., based upon respective location coordinates estimated via GPS, forward link trilateration, etc.). In an example, the detection of 500 can be implemented by the proximity detection module 190 as shown in FIGS. 1-3, the transceiver 206 in combination with ASIC 208 as shown in FIG. 2, the logic configured to receive and/or transmit information 305 as shown in FIG. 3, the module 405 of FIG. 4, or any combination thereof.

In response to the detection of 500, the given client device classifies a relationship type (e.g., "friend", "work", "short phone call friends", "long phone call friends", "10+IMs per day friend", etc.) for each respective proximate client device in the set of proximate client device based on a local evaluation of one or more interactions between the given client device and at least one proximate client device from the set of proximate client devices, 505. For example, a log of one or more interactions (e.g., a call log, a message log, a proximate detection log, etc.) that is maintained by the given client device can be evaluated by the given client device to perform the classification at 505, as will be described in more detail below with respect to FIG. 6. In an example, the classification of 505 can be implemented by the classification module 193 as shown in FIGS. 1-3, the ASIC 208 as shown in FIG. 2, the logic configured to process information 310 as shown in FIG. 3, the module 410 of FIG. 4, or any combination thereof.

Based on the classified relationship(s) from 505, the given client device determines whether to automatically trigger a communicative action with one or more proximate client devices from the set of proximate client devices, 510. In an example, the determination of 510 can be implemented by the action determination module 196 as shown in FIGS. 1-3, the ASIC 208 as shown in FIG. 2, the logic configured to process information 310 as shown in FIG. 3, the module 415 of FIG. 4, or any combination thereof.

Figure 6:
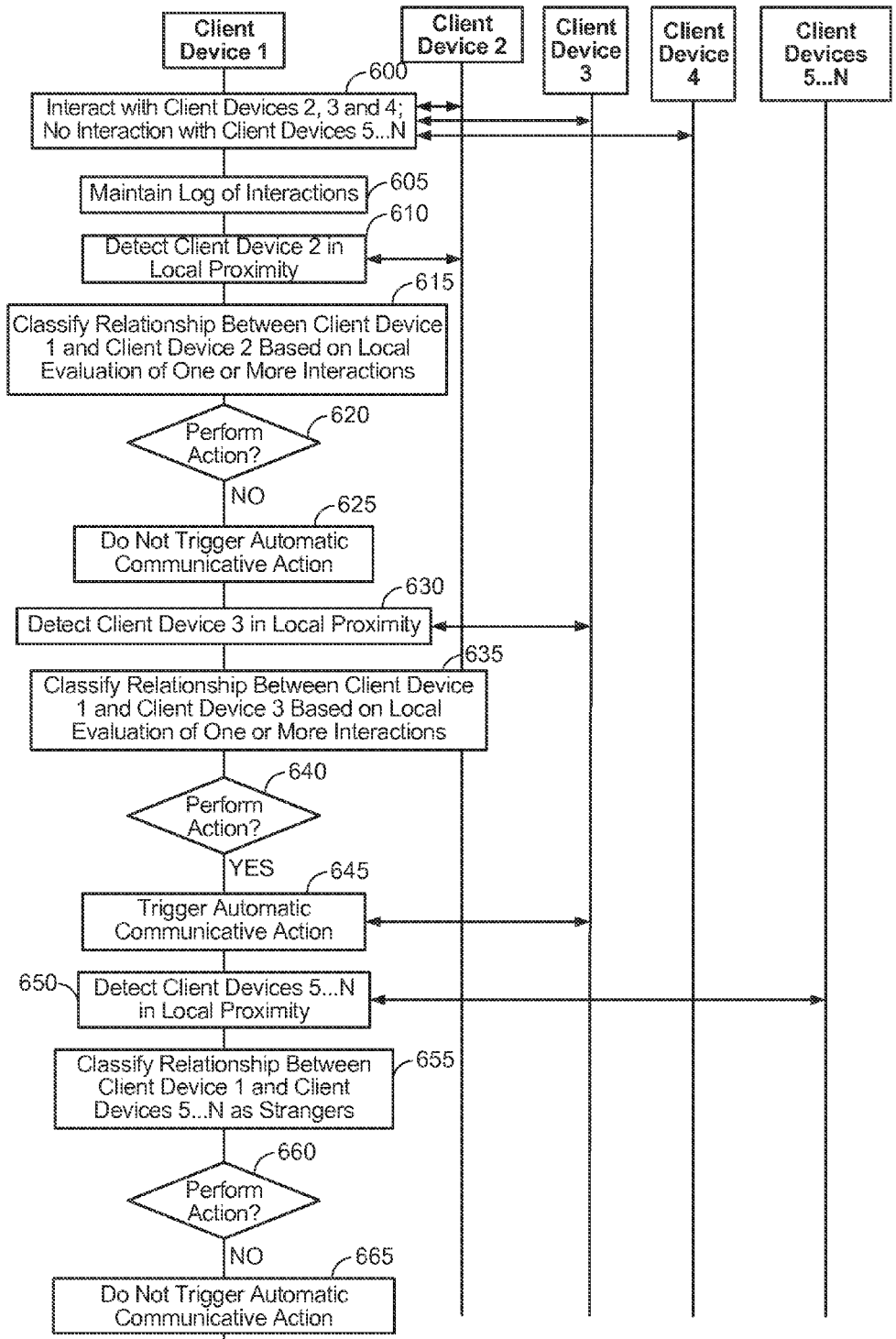
FIG. 6 illustrates a more detailed implementation of the process of FIG. 5 in accordance with an aspect of the disclosure.

FIG. 6 illustrates a more detailed implementation of the process of FIG. 5 in accordance with an aspect of the disclosure. Referring to FIG. 6, the given client device from the discussion of FIG. 5 corresponds to client device 1. In particular, 600-625, 630-645 and 650-665 each show a different optional implementation of the process of FIG. 5.

Referring to FIG. 6, client device 1 interacts via one or more interactions with client devices 2, 3 and 4 over a period of time, and client device 1 does not interact with client devices 5 . . . N over the period of time, 600. The one or more interactions of 600 can take a variety of forms, including but not limited to emails, voice calls, video calls, instant messages, social media messages, proximate detections (e.g., client devices 1 and 2 are both at Starbucks on Thursdays between 2-4 PM, client devices 1 and 3 are within Bluetooth range of each other during normal work hours, etc.), and so on. Client device 1 maintains a log of the one or more interactions from 600, 605. The log of one or more interactions can be generated at client device 1 itself via local interaction monitoring, or can be downloaded from at least one external server, or both. For example, client device 1 can add interaction information to the log of one or more interactions based on "local" interaction monitoring at client device 1 (i.e., self-monitoring), while also periodically supplementing the local interaction monitoring information in the log of one or more interactions with "external" information downloaded from the external server(s). Irrespective of whether the information in the log of one or more interactions is initially generated at client device 1, the external server(s) or some combination thereof, the log of one or more interactions is maintained locally at client device 1 so that client device 1 may classify its own relationship associations, as will be described in more detail below.

In an example of 605, the log of one or more interactions can include a message log, a call log, a proximity detection log, or any combination thereof. The log of one or more interactions maintained at 605 can include statistical information related to the one or more interactions from 600, actual recordings of the one or more interactions from 600, or both. For example, for a call log, the log of one or more interactions can include statistical information related to calls in which client device 1 participated (e.g., duration of calls, whether calls including an audio component, a video component or both, a timing when a call starts or end such as time of day, whether client device 1 was the call originator or call target, an identifier or contact address of the other call party for a 1:1 call or identifiers or contact addresses of other call parties for a group call, how long client device 1 held the floor for a half-duplex call, how many times client device 1 requested the floor for a half-duplex call, whether the operator of client device 1 muted client device 1 during the call, etc.). The call log could also optionally include audio and/or video recordings of at least some of the logged calls (e.g., whole recordings or mere excerpts). The call log could also optionally obtain call-extracted information or content excerpt, such as whether certain keywords were used in calls (e.g., an operator of client device 1 may refer to an operator of client device 2 or client device 3 as their "best friend", "sister" or "work colleague", or the operator of client device 1 is told "I love you" by the other party which implies the other party is a friend or family member of the operator of client device 1, etc.) which may help classify a relationship of the respective operators of client devices 1 . . . 4.

Similarly, for a message log, the log of one or more interactions can include statistical information (e.g., length of message, message type such as instant message, social network message or email, time of day when message is sent, etc.), or message content (e.g., excerpts of an email or instance message, attachments to an email, etc.). More specifically, the message log can include a duration, timing or length of messages exchanged between the client device and at least one proximate client device, whether the client device or the at least one proximate client device initiated a respective message between the client device and the at least one proximate client device, at least one contact address for the at least one proximate client device is local or international, a location classification of the client device when one or more messages are exchanged between the client device and the at least one proximate client device (e.g., client device 1 only messages client device 2 when client device 1 is at a Home Location during non-work hours, etc.), and/or a content excerpt from at least one message exchanged between the client device and the at least one proximate client device.

For a proximity detection log, the log of one or more interactions can include a number of times or frequency in which client device 1 is detected as being proximate to client device 2, client device 3 or client device 4, a duration and/or time of day at which client device 1 remain proximate with client device 2, client device 3 or client device 4 (e.g., if client devices 1 and 2 are usually proximate between 6 PM until 5 AM the next day, then the operators of client devices 1 and 2 probably live together), how long it has been since a previous proximate detection, whether a frequency of one or more proximate detections has changed (e.g., a boyfriend operating client device 1 breaks up with a girlfriend operating client device 2, resulting in a reduction in proximate detections between client devices 1 and 2 from which a relationship status change is inferred, etc.) and so on.

In a further example, the call log, proximate detection and/or message log components can include a location classification. For example, if client device 1 calls client device 2 via an international phone number, the call log may reflect the call as an international call. If the international calls between client device 1 and client device 2 occur consistently over time, client device 2 can be classified as an international contact relative to client device 1. In another example, the call log can reflect that client device 1 calls or messages client device 2 only when client device 1 is at a Work Location, or the message log can reflect that client device 2 only messages client device 3 when client device is at a Home Location, and so on. The proximate detection log can reflect that client devices 1 and 2 are only proximately while at a Home Location, which implies that client device 2 is operated by a roommate who does not hang out with the operator of client device 1 outside of the Home Location.

Accordingly, the log of one or more interactions maintained by client device 1 can include any type of information that can be ascertained from one or more previous interactions that is relevant to classifying a relationship (e.g., relationship type, degree of relationship, or both) between the operator of client device 1 and the operators of client devices with which client device 1 interacts.

At 610, client device 1 detects client device 2 in local proximity (e.g., similar to 500 of FIG. 5, with the set of proximate client devices including client device 2). Client device 1 then classifies its relationship to client device 2 based on a local evaluation of one or more interactions between client device 1 and client device 2 (e.g., from the log of one or more interactions) in response to the proximity detection of 610, 615. For example, at 615, logged information that is relevant to classifying a relationship between client devices 1 and 2 (or their operators) can be extracted from the log of information, and then used to classify the relationship. As used herein, the term "relationship" is used interchangeably to refer to operator-to-operator (or user-to-user) relationships. So, a reference to client device 1 having a relationship to client device 2 implies that their respective operators have a relationship, as opposed to the devices themselves. Also, while the classifying operation of 615 is described as occurring in response to the proximity detection of 610, it will be appreciated that some relationships can be pre-classified by client device 1 as opposed to having the classifying operation specifically triggered by the proximity detection. Irrespective of whether the classifying operation is a pre-classifying operation or a proximity detection triggered operation, the actual relationship classification occurs at client device 1 and not at an external server (e.g., such as a social networking server), and the relationship classification does not necessarily rely upon direct user input. In other words, the one or more interactions are monitored in an automated manner at 615 to classify the relationship between client devices 1 and 2, as opposed to the operator of client device 1 manually identifying client device 2 as a Work contact or a Family member.

Examples of how one or more different types of one or more interactions between client device 1 and client device 2 can be used to classify the relationship at 615 will now be provided. In Table 1 (below), examples are provided whereby one or more different interactions are mapped to both a relationship type and a degree of relationship. For convenience of explanation, the degrees of relationship are identified as "close", "intermediate" or "far", although additional nuance can be added to the degrees of relationship in other aspects of the disclosure.

TABLE 1

Relationship Classification Examples

| | Monitored Interaction(s) | Relationship Type | Degree of Relationship |
|---|---|---|---|
| 1 | Call Log:<br>Frequency: 5-10 local calls per week during work hours;<br>Duration: 30-60 seconds each call;<br>Message Log: N/A (no messages)<br>Proximity Detection Log: N/A (no proximity detections) | "Local Work Call Contact" | Close |
| 2 | Call Log:<br>Frequency: 1-2 local calls per week initiated by Client Device 2 during non-work hours;<br>Duration: 30 minutes per call;<br>Message Log:<br>Frequency: 10+ instant messages per day;<br>Content: Personal in nature<br>Proximity Detection Log: N/A (no proximity detections) | "Remote Long Call High IM Friend" | Close |
| 3 | Call Log: N/A (no calls)<br>Message Log: N/A (no messages) | "Roommate" | Intermediate |

TABLE 1-continued

Relationship Classification Examples

| | Monitored Interaction(s) | Relationship Type | Degree of Relationship |
|---|---|---|---|
| | Proximity Detection Log:<br>Location: Home<br>Frequency: 5+ times per day;<br>Duration: Long (60+ minutes) | | |
| 4 | Call Log:<br>Frequency: 1 international call per year during work hours;<br>Location: Work Office;<br>Duration: 5 minutes each call;<br>Message Log: N/A (no messages)<br>Proximity Detection Log: N/A (no proximity detections) | "International Work Call Contact" | Far |
| 5 | Call Log: N/A (no calls)<br>Message Log:<br>Frequency: 1 email per month during work hours;<br>Location: Work Office<br>Proximity Detection Log:<br>Frequency: 1 time per month after email<br>Duration: 5 minutes | "Email Work Meeting Contact" | Intermediate |
| 6 | Call Log: N/A (no calls)<br>Message Log:<br>Frequency: 10+ instant messages per day<br>Location: School and Home<br>Excerpt: ". . . I love you Mom!"<br>Proximity Detection Log:<br>Frequency + Duration: 1 weekend per month | "Family" | Close |

As will be appreciated, information from the call log, message log and/or proximity detection log can be evaluated to determine the relationship (e.g., the relationship type, degree of relationship or both), as shown in Examples 1-6 from Table 1 (above). In Example 1 from Table 1, frequent phone calls during work hours designate client device 2 as a "Local Work Call Contact" of client device 1, with the high number of calls designating client device 1 as having a "Close" degree of relationship with client device 2. In Example 2 from Table 1, fewer but longer phone calls during non-work hours along with a high number of personal instant messages (IMs) designate client device 2 as a "Remote Long Call High IM Friend" of client device 1, with the long calls and high number of personal IMs further designating client device 1 as having a "Close" degree of relationship with client device 2. In Example 3 from Table 1, limited communication via calls or messages occurs between client devices 1 and 2, but numerous high frequency and high duration proximity detections occur between client devices 1 and 2 at a Home location. This implies that client device 2 is operated by a roommate of the operator of client device 1, but not necessarily a friend given their lack of device-to-device communication. Thereby, client device 2 in Example 3 is designated as a "Roommate" of client device 1, with the limited communication further designating client device 1 as having an "Intermediate" degree of relationship with client device 2.

In Example 4 from Table 1, infrequent but consistent short yearly calls between client devices 1 and 2 while client device 1 is at a Work Office location designate client device 2 as an "International Work Call Contact" of client device 1, with the limited frequency and duration of the calls along with no messages or proximity detections causing client device 1 to have a "Far" degree of relationship with client device 2. In Example 5 from Table 1, infrequent emails during work hours from a Work Office location followed by brief post-email meetings designates client device 2 as an "Email Work Meeting Contact" of client device 1, with client device 1 having a have an "Intermediate" degree of relationship with client device 2. In Example 6 from Table 1, frequent instant messages coupled with excerpts that qualify client device 2 as being operated by a mother of the operator of client device 1 designates client device 2 as "Family" of client device 1 with a "Close" degree of relationship.

It will be appreciated that Table 1 (above) merely provides a few specific examples of how various interactions can be mapped to a given relationship classification (e.g., relationship type and degree of relationship), and that there are many other potential relationship classifications that could occur from the same interaction(s) or different interaction(s). Also, in some cases, the relationship type classification can be determined without estimating an associated degree of the relationship. As will be appreciated, a user may want certain communicative actions triggered automatically for any Family member (e.g., sharing a public profile picture and an up-to-date public contact address portion of a contact address profile), irrespective of the degree of relationship between the user and the Family member. In a further example, other relationship classifications can be defined by temporal, spatial and/or social proximity between two respective contacts.

Returning to FIG. 6, after classifying the relationship between client device 1 and client device 2 at 615, client device 1 determines whether to automatically trigger a communicative action with client device 2 based on the relationship classification, 620 (e.g., similar to 510 of FIG. 5). Table 2 (below) shows a few examples of communicative actions that can be automatically triggered responsive to proximity detections with client devices identified has having particular qualifying relationships with client device 1:

TABLE 2

Examples of Automatically Triggered Actions for Proximately Detected Client Device Based on Relationship Classification

| | Qualifying Relationship(s) | Automatically Triggered Action(s) |
|---|---|---|
| 1 | Qualifying Relationships:<br>Family (Close, Intermediate, Far);<br>Friends (Close, Intermediate)<br>Conditions:<br>Location = Home | Share a Home WiFi Access Password |
| 2 | Qualifying Relationships:<br>Family (Close, Intermediate, Far);<br>Friends (Close, Intermediate, Far);<br>Conditions:<br>None | Share contact information associated with client device 1 |
| 3 | Qualifying Relationships:<br>Work (Close, Intermediate)<br>Conditions:<br>Location = Work | Share work-specific contact information associated with client device 1 |
| 4 | Qualifying Relationships:<br>Family (Close, Intermediate);<br>Friends (Close, Intermediate);<br>Conditions:<br>None | (1) Permit access to digital content, or<br>(2) Request access to digital content. |
| 5 | Qualifying Relationships:<br>Family (Close);<br>Friends (Close);<br>Conditions:<br>None | (1) Permit access to behavioral profile data, or<br>(2) Request access to behavioral profile data |

In Example 1 from Table 2 (above), when client device 1 determines itself to be located at a Home Location (e.g., based on GPS coordinates, based on being connected to a Home AP, etc.) and client device detects a proximate client device that is classified as Family (Close, Intermediate, Far) or Friend (Close, Intermediate), client device 1 can automatically push a WiFi access password to a Home AP at the Home Location (e.g., a Service Set Identifier (SSID): "MyHomeRouter", Password: "Password1234"). As will be appreciated, the operator of client device 1 would not necessarily want his/her WiFi access password automatically shared with anyone at his/her Home Location, nor would the operator of client device 1 necessarily want to share his/her contacts who are not actually at the Home Location where the WiFi access password is used. Thereby, the WiFi access password can only be shared with client devices associated with a certain relationship classification (e.g., relationship type and/or degree of relationship) when proximately detected at the Home Location.

In Example 2 from Table 2 (above), when client device 1 detects a proximate client device that is classified as a Family (Close, Intermediate, Far) or Friend (Close, Intermediate, Far), client device 1 can automatically send updated contact information to the detected proximate client device. For example, if client device 2 is operated by a friend of the operator of client device 1, client device 2 likely has a contact record with some contact information for the operator of client device 1. Client device 1 is likely to have current contact information for the operator of client device 1 (e.g., email, home address, phone number, etc.), whereas client device 2 is more likely to have out-of-date contact information for client device 1. As will be appreciated, the operator of client device 1 would not necessarily want contact information automatically shared with anyone who happens to be proximately detected by client device 1. Thereby, some or all of client device 1's contact information for the operator of client device 1 can be shared with client devices associated with a certain relationship classification (e.g., relationship type and degree of relationship) when proximately detected.

In Example 3 from Table 2 (above), when client device 1 determines itself to be located at a Work Location (e.g., based on GPS coordinates, based on being connected to a Work AP, etc.) and client device detects a proximate client device that is classified as a Work colleague (Close, Intermediate), client device 1 can automatically send work-specific contact information to the detected proximate client device. For example, if client device 2 is operated by an Intermediate or Close Work colleague, client device 2 likely has a contact record with some contact information for the operator of client device 1 with client device 1 potentially having more up-to-date contact information for the operator of client device 1. However, the operator of client device 1 may not want all of his/her contact information shared with a Work colleague, such as home address, a personal email address, a personal profile picture, a home phone number, and so on. Thereby, in an example, only client device 1's work-specific contact information (e.g., work email address, work address, work phone number, professional profile picture, work website address, etc.) for the operator of client device 1 can be shared with Work Colleagues of client device 1.

In Example 4 from Table 2 (above), when client device 1 detects a proximate client device that is classified as Friend (Close, Intermediate) or Family (Close, Intermediate), client device can either automatically grant the detected proximate client device to access to client device 1's digital content or can automatically request access to digital content owned by the detected proximate client device. For example, the operator of client device 1 may be interested in purchasing digital content (e.g., a book or a movie), so the operator adds the digital content to a wish list. The operator can further establish a rule whereby proximately detected Friends (Close, Intermediate) or Family (Close, Intermediate) are automatically queried to request to borrow the digital content listed on the operator's wish list. In a reverse example, the operator of client device 1 may own certain digital content, and client device 1 may receive a request from the detected proximate client device to borrow the digital content. In this case, operator can further establish a rule whereby these types of digital content requests are automatically granted for proximately detected Friends (Close, Intermediate) or Family (Close, Intermediate), assuming operator 1 actually owns the digital content and is permitted to lend it to other client devices.

In Example 5 from Table 2 (above), when client device 1 detects a proximate client device that is classified as Friend (Close, Intermediate) or Family (Close, Intermediate), client device can either automatically grant the detected proximate client device access to client device 1's behavioral profile data (e.g., a list of websites visited by client device 1, a purchase history of client device 1, a list of e-books that have been read by the operator on client device 1, etc.) or can automatically request access to behavioral profile data for the detected proximate client device. For example, the operator of client device 1 may be interested in purchasing digital content (e.g., a book or a movie), so the operator identifies the digital content to be of interest in his/her profile. The operator can further establish a rule whereby proximately detected Friends (Close, Intermediate) or Family (Close, Intermediate) are automatically queried to request whether they have viewed or purchased the identified digital content. In a reverse example, the operator of client device 1 may receive a request from the detected proximate client device to obtain information behavioral profile data that characterizes client device 1 (and/or its operator), and these types of behavioral profile data requests are automatically granted for proximately detected Friends (Close) or Family (Close).

Returning to FIG. 6, at 620, assume that client device 1 determines not to automatically trigger a communicative action with client device 2 based on the relationship classification at 620. For example, client device 2 may be classified as a Friend (Far) at 615 and a current location of client device 1 may be a Work Location, so client device 1 may decide not to automatically share a Home WiFi password with client device 2 in this scenario. Accordingly, client device 1 does not trigger any automatic communicative action with client device 2, 625.

At 630, client device 1 detects client device 3 in local proximity (e.g., similar to 500 of FIG. 5, with the set of proximate client devices including client devices 2 and 3 at this point). Client device 1 classifies a relationship (e.g., relationship type, degree of relationship, or both) for client device 3 based on a local evaluation of one or more interactions between client device 1 and client device 3 (e.g., from the log of one or more interactions) in response to the proximity detection of 630, 635 (e.g., similar to 615). For example, at 635, logged information that is relevant to classifying a relationship between client devices 1 and 3 (or their operators) can be extracted from the log of information, and then used to classify a relationship type and degree of relationship between client devices 1 and 3 (or their operators).

At 640, assume that client device 1 determines to automatically trigger a communicative action with client device 3 based on the relationship classification at 635. For example, client device 3 may be classified as a Friend (Close) at 635 and a current location of client device 1 may be a Home Location, so client device 1 may decide to automatically share a Home WiFi password with client device 3 in this scenario. Accordingly, client device 1 triggers at least one automatic communicative action with client device 3, 645. In an example, multiple automatic communicative actions can be triggered at 645 (e.g., client device 1 can send a Home WiFi password to client device 3 while also granting client device 3 access to behavior profile data and requesting digital content from client device 3 that is identified in a wish list of client device 1, etc.).

At 650, client device 1 detects client devices 5 . . . N in local proximity (e.g., similar to 500 of FIG. 5, with the set of proximate client devices including client devices 2 . . . N at this point). Client device 1 attempts to classify relationship(s) (e.g., relationship type, degree of relationship, etc.) for client devices 5 . . . N in response to the proximity detection of 650, but in this case there are no interactions with any of client devices 5 . . . N in the log of one or more interactions, so client devices 5 . . . N are classified with a default or "stranger" status, 655. For example, client devices 5 . . . N may be operated by users who do not know the operator of client device 1 at all, and are not recognized as being associated with client device 1 except for their respective proximities to client device 1 (e.g., the respective client devices may simply be nearby strangers at a movie theater, shopping mall, etc.). At 660, client device 1 determines not to automatically trigger a communicative action with client devices 5 . . . N due to their associated "stranger" status, and client device 1 does not trigger any automatic communicative action with client devices 5 . . . N, 665.

Further, as will be appreciated from a review of FIG. 6, client device 1 interacts with client device 4 at 600 even though client device 4 is not detected as being in proximity to client device 1 during the process of FIG. 6. This emphasizes that the logging operation of 600 can include a remote logging aspect (e.g., one or more calls or messages exchanged between client devices that are not proximate, etc.) even if the respective client devices do not become proximate.

Figure 7:
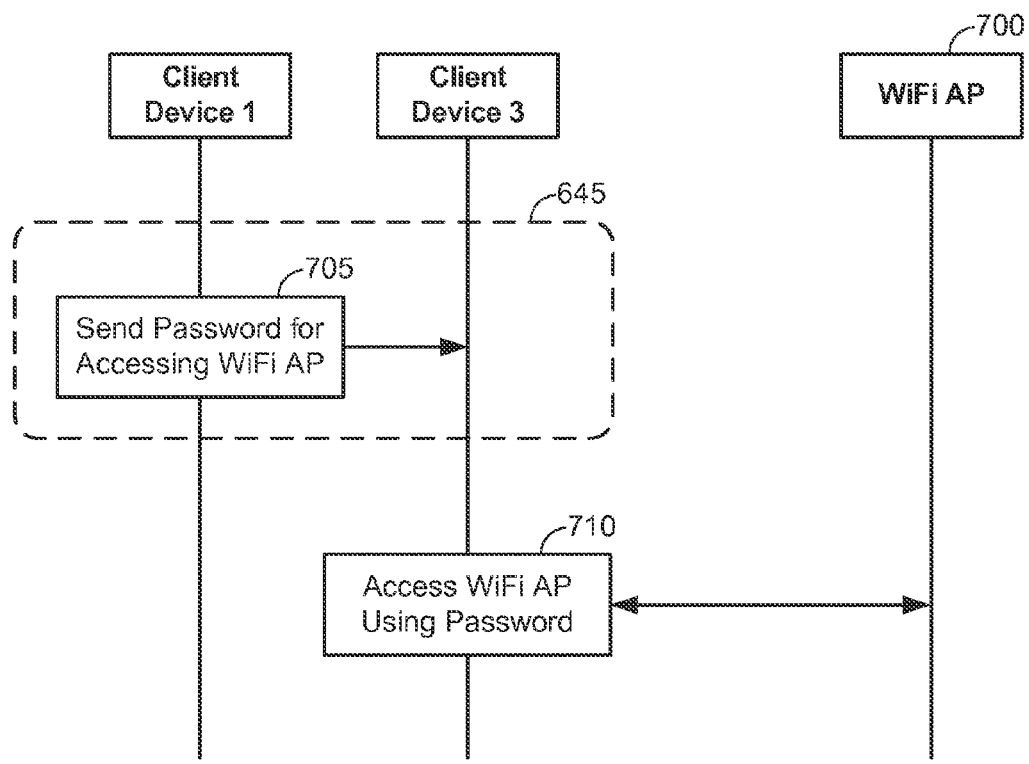
FIG. 7 illustrates an example implementation of a portion of the process of FIG. 6 in accordance with an aspect of the disclosure.

FIG. 7 illustrates an example implementation of a portion of the process of FIG. 6 in accordance with an aspect of the disclosure. In other words, the process of FIG. 7 is an optional manner of executing the process of FIG. 6. In particular, FIG. 7 illustrates an example whereby the communicative action that is automatically triggered by client device 1 at 645 of FIG. 6 is sharing a password to a WiFi AP 700, similar to Example 1 from Table 2 (above).

Referring to FIG. 7, after client device 3 is detected as a proximate client device and verified to have a relationship that qualifies client device 3 to automatically trigger delivery of a password for the WiFi AP 700, client device 1 transmits the password to client device 3, 705 (e.g., as part of execution of 645 of FIG. 6). In an example, the password can be transmitted from client device 1 to client device 3 via a direct connection, such as a peer-to-peer connection (e.g., Bluetooth, etc.). Alternatively, the password can be transmitted from client device 1 to client device 3 via a network connection that is separate from the WiFi AP 700 (e.g., a cellular connection, etc.). Once client device 3 obtains the password, client device 3 can attempt to automatically connect to the WiFi AP 700 using the password, 710.

Figure 8:
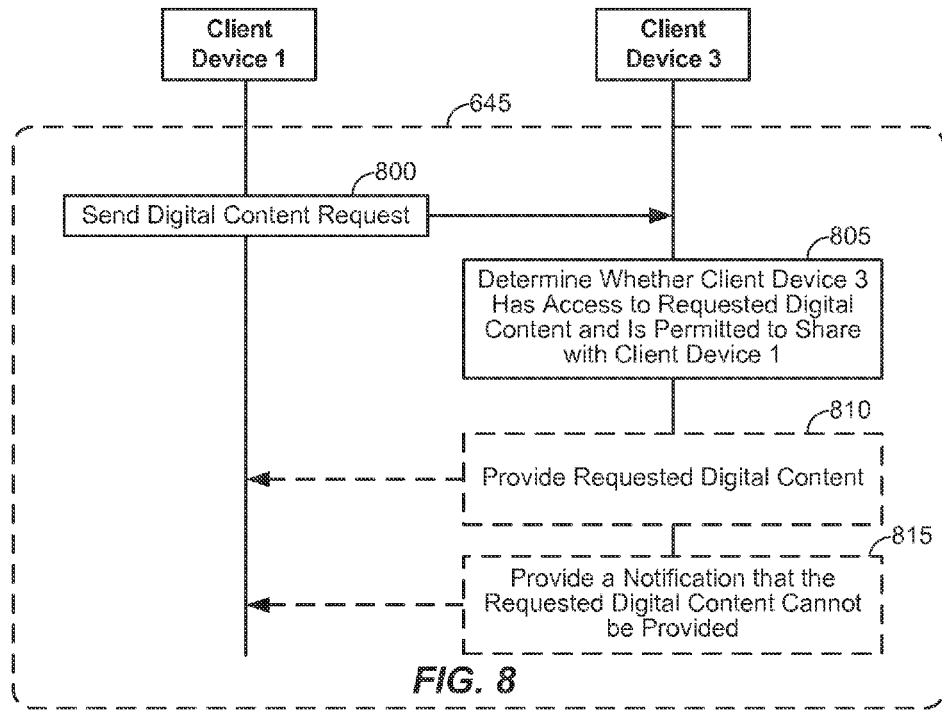
FIG. 8 illustrates an example implementation of a portion of the process of FIG. 6 in accordance with another aspect of the disclosure.

FIG. 8 illustrates an example implementation of a portion of the process of FIG. 6 in accordance with another aspect of the disclosure. In other words, the process of FIG. 8 is an optional manner of executing the process of FIG. 6. In particular, FIG. 8 illustrates an example whereby the communicative action that is automatically triggered by client device 1 at 645 of FIG. 6 is requesting access to digital content, similar to Example 4(2) from Table 2 (above).

Referring to FIG. 8, after client device 3 is detected as a proximate client device and verified to have a relationship that qualifies client device 3 to automatically trigger digital content requests (e.g., requests for an e-book or movie added to a wish list for the operator of client device 1, etc.), client device 1 transmits the digital content request to client device 3, 800. The digital content request can be transmitted from client device 1 to client device 3 via a direct connection, such as a peer-to-peer connection (e.g., Bluetooth, etc.), or via a network connection. Client device 3 receives the digital content request and determines whether client device 3 has access to the requested digital content, and if so, whether client device 3 is permitted to share the requested digital content with client device 1, 805. Based on the determination of 805, client device 3 either provides the requested digital content to client device 1 (e.g., by attaching the requested digital content, by providing a URL where the requested digital content can be accessed, etc.), 810, or alternatively provides a notification that the requested digital content cannot be provided, 815. As will be appreciated, 800-815 of FIG. 8 can collectively correspond to part of the execution of 645 of FIG. 6. Further, while not shown explicitly in FIG. 8, the determination of 805 can be based upon parallel execution of the process of FIG. 6 at client device 3, similar to Example 4(1) from Table 2 (above) and FIG. 9 (below), whereby client device 3 automatically grants the digital content request of 800 based on client device 1 having a recognized qualifying relationship with client device 3.

Figure 9:
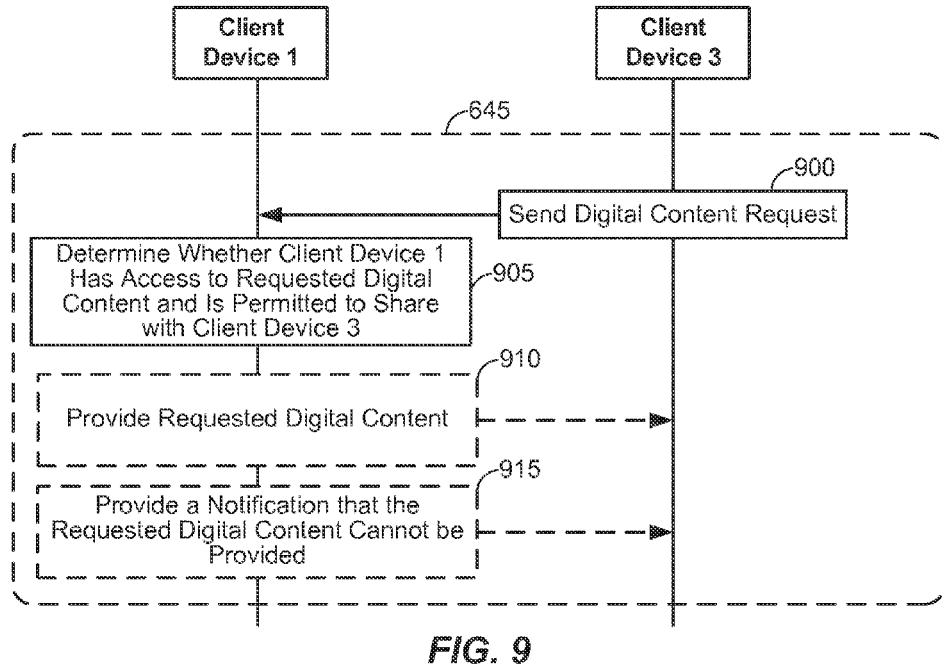
FIG. 9 illustrates an example implementation of a portion of the process of FIG. 6 in accordance with another aspect of the disclosure.

FIG. 9 illustrates an example implementation of a portion of the process of FIG. 6 in accordance with another aspect of the disclosure. In other words, the process of FIG. 9 is an optional manner of executing the process of FIG. 6. In particular, FIG. 9 illustrates an example whereby the communicative action that is automatically triggered by client device 1 at 645 of FIG. 6 is providing access to digital content, similar to Example 4(1) from Table 2 (above).

Referring to FIG. 9, after client device 3 is detected as a proximate client device and verified to have a relationship that qualifies client device 3 to have its digital content requests (e.g., requests for an e-book or movie added to a wish list for the operator of client device 1, etc.) automatically granted by client device 1, client device 3 transmits a digital content request to client device 1, 900. The digital content request can be transmitted by client device 1 to client device 3 via a direct connection, such as a peer-to-peer connection (e.g., Bluetooth, etc.), or via a network connection. Client device 1 receives the digital content request and determines whether client device 3 has access to the requested digital content, and if so, whether client device 3 is permitted to automatically share the requested digital content with client device 1, 905. More specifically, client device 1 verifies whether its relationship with client device 3 is a qualifying relationship (e.g., Family (Close, Intermediate) or Friend (Close, Intermediate)) that permits automatically granting digital content requests, as in Example 4(1) from Table 2 (above). Based on the determination of 905, client device 1 either provides the requested digital content to client device 3 (e.g., by attaching the requested digital content, by providing a URL where the requested digital content can be accessed, etc.), 910, or alternatively provides a notification that the requested digital content cannot be provided, 915. As will be appreciated, 900-915 of FIG. 9 can collectively correspond to part of the execution of 645 of FIG. 6. Further, while not shown explicitly in FIG. 9, the transmission of the digital content request at 900 can be based upon parallel execution of the process of FIG. 6 at client device 3, similar to Example 4(2) from Table 2 (above) or FIG. 8 (above), whereby client device 3 automatically transmits the digital content request of 900 based on client device 1 having a recognized qualifying relationship with client device 3.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any type of processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Accordingly, an aspect of the disclosure can include a non-transitory computer-readable medium containing instructions stored thereon, which, when executed by a client device, cause the client device to perform operations, the instructions including at least one instruction to cause the client device to detect a set of proximate client devices, at least one instruction to cause the client device to classify, for each respective proximate client device in the set of proximate client devices, a relationship relative to an operator of the client device based on a local evaluation of one or more interactions between the client device and at least one proximate client device from the set of proximate client devices in response to the detecting and at least one instruction to cause the client device to determine whether to automatically trigger a communicative action with one or more proximate client devices from the set of proximate client devices based on the classifying.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a client device, comprising:
   detecting a set of proximate client devices;
   classifying, for each respective proximate client device in the set of proximate client devices, a relationship relative to an operator of the client device based on a local evaluation of one or more user-to-user communicative interactions between the client device and at least one proximate client device from the set of proximate client devices in response to the detecting; and determining whether to automatically trigger a communicative action with one or more proximate client devices from the set of proximate client devices based on the classifying.

2. The method of claim 1, further comprising:
locally logging one or more interactions between the operator of the client device and the at least one proximate client device before the detecting,
wherein the local evaluation of the one or more user-to-user communicative interactions includes an evaluation of the one or more locally logged interactions.

3. The method of claim 1, further comprising:
downloading, from a server, a log of one or more interactions between the client device and the at least one proximate client device before the detecting,
wherein the local evaluation of the one or more user-to-user communicative interactions includes an evaluation of the downloaded log of one or more interactions.

4. The method of claim 1, wherein the one or more user-to-user communicative interactions evaluated by the local evaluation include one or more communication metrics from a call log, a message log, or any combination thereof.

5. The method of claim 4, wherein the one or more user-to-user communicative interactions evaluated by the local evaluation include the one or more communication metrics from the call log.

6. The method of claim 5, wherein the one or more communication metrics from the call log include:
a duration, timing or frequency of one or more calls between the client device and the at least one proximate client device, or any combination thereof, or
whether the one or more calls between the client device and the at least one proximate client device includes an audio component, a video component or any combination thereof, or
whether the client device or the at least one proximate client device initiated a respective call between the client device and the at least one proximate client device, or
whether a given operator of the client device accepts an incoming call from the at least one proximate client device, or
whether at least one operator of the at least one proximate client device accepts a given call from the client device, or
wherein at least one contact address for the at least one proximate client device is local or international, or
a location classification of the client device during a set of calls between the client device and the at least one proximate client device, or
a content excerpt from media exchanged between at least one call between the client device and the at least one proximate client device, or
any combination thereof.

7. The method of claim 4, wherein the one or more user-to-user communicative interactions evaluated by the local evaluation include the one or more communication metrics from the message log.

8. The method of claim 7, wherein the one or more communication metrics from the message log include:
a duration, timing or length of one or more messages exchanged between the client device and the at least one proximate client device, or
whether the client device or the at least one proximate client device initiated a respective message between the client device and the at least one proximate client device, or
at least one contact address for the at least one proximate client device is local or international, or
a location classification of the client device when a set of messages is exchanged between the client device and the at least one proximate client device, or
a content excerpt from at least one message exchanged between the client device and the at least one proximate client device, or
any combination thereof.

9. The method of claim 1, wherein the location evaluation is further based at least in part upon one or more communication metrics from a proximate connection log.

10. The method of claim 9, wherein the one or more communication metrics from the proximate connection log include:
a duration, timing or frequency of one or more proximate connections between the client device and the at least one proximate client device, or
a location classification of the client device associated with the one or more proximate connections, or
any combination thereof.

11. The method of claim 1, wherein the classifying classifies each respective proximate client device by relationship type, by degree of relationship, or any combination thereof.

12. The method of claim 11, wherein the relationship type is one of a friend, family member, telemarketer, business colleague or any combination thereof, relative to the operator of the client device.

13. The method of claim 1, further comprising:
maintaining a set of communicative actions to be automatically triggered in response to detection of a given proximate client device that satisfies a corresponding relationship condition,
wherein the determining compares the classified relationship of each proximate client device in the set of proximate client devices to the corresponding relationship condition for each communicative action in the set of communicative actions.

14. The method of claim 1, wherein the communicative action includes transmitting protected information to the at least one proximate client device.

15. The method of claim 14, wherein the protected information includes digital content owned by the operator of the client device, contact information associated with the operator of the client device, behavioral profile data associated with the client device, a password, or any combination thereof.

16. The method of claim 1, wherein the communicative action includes requesting protected information from the at least one proximate client device.

17. The method of claim 16, wherein the protected information includes digital content owned by the operator of the at least one proximate client device, contact information associated with the operator of the at least one proximate client device, behavioral profile data associated with the at least one proximate client device, a password, or any combination thereof.

18. The method of claim 1, wherein the determining determines to automatically trigger the communicative action, further comprising:
performing the communicative action with the one or more proximate client devices.

19. The method of claim 1, wherein the determining determines not to automatically trigger the communicative action.

20. A client device, comprising:
means for detecting a set of proximate client devices;
means for classifying, for each respective proximate client device in the set of proximate client devices, a relationship relative to an operator of the client device based on a local evaluation of one or more user-to-user communicative interactions between the client device and at least one proximate client device from the set of proximate client devices in response to the detection; and
means for determining whether to automatically trigger a communicative action with one or more proximate client devices from the set of proximate client devices based on the classification.

21. The client device of claim 20, wherein the one or more user-to-user communicative interactions evaluated by the local evaluation are based on a call log that includes:
a duration, timing or frequency of one or more calls between the client device and the at least one proximate client device, or any combination thereof, or
whether the one or more calls between the client device and the at least one proximate client device including an audio component, a video component or any combination thereof, or
whether the client device or the at least one proximate client device initiated a respective call between the client device and the at least one proximate client device, or
whether a given operator of the client device accepts an incoming call from the at least one proximate client device, or
whether at least one operator of the at least one proximate client device accepts a given call from the client device, or
wherein at least one contact address for the at least one proximate client device is local or international, or
a location classification of the client device during a set of calls between the client device and the at least one proximate client device, or
a content excerpt from media exchanged between at least one call between the client device and the at least one proximate client device, or
any combination thereof.

22. The client device of claim 20, wherein the one or more user-to-user communicative interactions evaluated by the local evaluation are based on a message log that includes:
a duration, timing or length of one or more messages exchanged between the client device and the at least one proximate client device, or any combination thereof, or
whether the client device or the at least one proximate client device initiated a respective message between the client device and the at least one proximate client device, or
at least one contact address for the at least one proximate client device is local or international, or
a location classification of the client device when a set of messages is exchanged between the client device and the at least one proximate client device, or
a content excerpt from at least one message exchanged between the client device and the at least one proximate client device, or
any combination thereof.

23. The client device of claim 20, wherein the location evaluation is further based at least in part upon one or more communication metrics from a proximate connection log that includes:

a duration, timing or frequency of one or more proximate connections between the client device and the at least one proximate client device, or any combination thereof, or
a location classification of the client device associated with the one or more proximate connections, or
any combination thereof.

24. A client device, comprising:
logic configured to detect a set of proximate client devices;
logic configured to classify, for each respective proximate client device in the set of proximate client devices, a relationship relative to an operator of the client device based on a local evaluation of one or more user-to-user communicative interactions between the client device and at least one proximate client device from the set of proximate client devices in response to the detection; and
logic configured to determine whether to automatically trigger a communicative action with one or more proximate client devices from the set of proximate client devices based on the classification.

25. The client device of claim 24, wherein the one or more user-to-user communicative interactions evaluated by the local evaluation are based on a call log that includes:
a duration, timing or frequency of one or more calls between the client device and the at least one proximate client device, or any combination thereof, or
whether the one or more calls between the client device and the at least one proximate client device including an audio component, a video component or any combination thereof, or
whether the client device or the at least one proximate client device initiated a respective call between the client device and the at least one proximate client device, or
whether a given operator of the client device accepts an incoming call from the at least one proximate client device, or
whether at least one operator of the at least one proximate client device accepts a given call from the client device, or
wherein at least one contact address for the at least one proximate client device is local or international, or
a location classification of the client device during a set of calls between the client device and the at least one proximate client device, or
a content excerpt from media exchanged between at least one call between the client device and the at least one proximate client device, or
any combination thereof.

26. The client device of claim 24, wherein the one or more user-to-user communicative interactions evaluated by the local evaluation are based on a message log that includes:
a duration, timing or length of one or more messages exchanged between the client device and the at least one proximate client device, or any combination thereof, or
whether the client device or the at least one proximate client device initiated a respective message between the client device and the at least one proximate client device, or
at least one contact address for the at least one proximate client device is local or international, or
a location classification of the client device when a set of messages is exchanged between the client device and the at least one proximate client device, or a content excerpt from at least one message exchanged between the client device and the at least one proximate client device, or any combination thereof.

27. The client device of claim 24, wherein the location evaluation is further based at least in part upon one or more communication metrics from a proximate connection log that includes:
    a duration, timing or frequency of one or more proximate connections between the client device and the at least one proximate client device, or any combination thereof, or
    a location classification of the client device associated with the one or more proximate connections, or
    any combination thereof.

28. A non-transitory computer-readable medium containing instructions stored thereon, which, when executed by a client device, cause the client device to perform operations, the instructions comprising:
    at least one instruction to cause the client device to detect a set of proximate client devices;
    at least one instruction to cause the client device to classify, for each respective proximate client device in the set of proximate client devices, a relationship relative to an operator of the client device based on a local evaluation of one or more user-to-user communicative interactions between the client device and at least one proximate client device from the set of proximate client devices in response to the detection; and
    at least one instruction to cause the client device to determine whether to automatically trigger a communicative action with one or more proximate client devices from the set of proximate client devices based on the classification.

29. The non-transitory computer-readable medium of claim 28, wherein the one or more user-to-user communicative interactions evaluated by the local evaluation are based on a call log that includes:
    a duration, timing or frequency of one or more calls between the client device and the at least one proximate client device, or any combination thereof, or
    whether the one or more calls between the client device and the at least one proximate client device including an audio component, a video component or any combination thereof, or
    whether the client device or the at least one proximate client device initiated a respective call between the client device and the at least one proximate client device, or
    whether a given operator of the client device accepts an incoming call from the at least one proximate client device, or
    whether at least one operator of the at least one proximate client device accepts a given call from the client device, or
    wherein at least one contact address for the at least one proximate client device is local or international, or
    a location classification of the client device during a set of calls between the client device and the at least one proximate client device, or
    a content excerpt from media exchanged between at least one call between the client device and the at least one proximate client device, or
    any combination thereof.

30. The non-transitory computer-readable medium of claim 28, wherein the one or more user-to-user communicative interactions evaluated by the local evaluation are based on a message log that includes:
    a duration, timing or length of one or more messages exchanged between the client device and the at least one proximate client device, or any combination thereof, or
    whether the client device or the at least one proximate client device initiated a respective message between the client device and the at least one proximate client device, or
    at least one contact address for the at least one proximate client device is local or international, or
    a location classification of the client device when a set of messages is exchanged between the client device and the at least one proximate client device, or
    a content excerpt from at least one message exchanged between the client device and the at least one proximate client device, or
    any combination thereof.

* * * * *